March 17, 1925.  
W. FROST  
1,530,255  
VULCANIZING APPARATUS  
Filed May 6, 1922
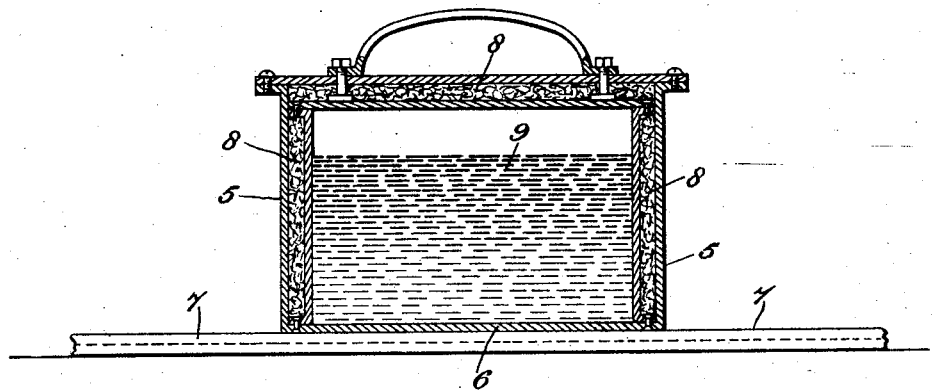
Inventor  
William Frost,  
By Wilkinson & Giusta,  
Attorneys Patented Mar. 17, 1925.

1,530,255

UNITED STATES PATENT OFFICE.

WILLIAM FROST, OF LONDON, ENGLAND, ASSIGNOR TO HARVEY FROST & COMPANY, LIMITED, OF LONDON, ENGLAND.

VULCANIZING APPARATUS.

Application filed May 6, 1922. Serial No. 559,025.

*To all whom it may concern:*

Be it known that I, WILLIAM FROST, a British subject, residing in London, England, have invented certain new and useful Improvements in Vulcanizing Apparatus, of which the following is a specification.

This invention is for improvements in or relating to vulcanizing apparatus and has for its object to provide an improved construction of apparatus whereby the process is simplified, particularly as regards the heat treatment. As is well known, the process of vulcanizing requires that the material shall be heated to a definite temperature, and maintained at that temperature for a definite period of time. Many attempts have been made to provide a heating unit which shall be more or less automatic in its action, in so far as the control of the temperature is concerned; it is also desirable, in order to save time, that heat should be supplied quickly to the material to raise it to the required temperature, and that the supply of heat should then be reduced in order that it may be maintained at that temperature without any further rise.

With these objects in view, there is provided, according to this invention, in vulcanizing apparatus, a heating unit comprising a thermal storage element which, when heated to a temperature not less than that required for vulcanizing, is of such a heat capacity that it can heat up the material to be vulcanized and maintain it at not less than vulcanizing temperature for substantially not more than the requisite period of time, upon the expiry of which time the temperature of the element will have fallen below that required for vulcanizing.

According to yet another feature of this invention, the thermal storage unit aforesaid is made of such a weight, in relation to the area of its base that when merely laid upon the article which is to be vulcanized it exerts the requisite pressure upon it. This construction is particularly suitable when dealing with articles such as the inner tubes of tires, which, when being repaired, require treatment over a comparatively small area, and which can be simply laid on a table for such treatment. Obviously, however, the heat storage element could be of any other shape to suit any special class of work. The figure is a diagrammatic sectional view through one form of an apparatus according to the invention.

In the specific embodiment of this invention, the heating unit is constituted by a preferably closed vessel 5 whereof one of the outer walls 6 is shaped in any desired manner to serve as the hot surface against which the material 7 to be vulcanized is held. The remaining surface of the vessel may be provided with suitable heat-insulating material 8 to reduce the amount of heat which is wasted or lost by radiation or conduction. This vessel contains a suitable quantity of material 9 which is selected so as to have a suitable heat capacity as above set forth. This material may be one which is solid at ordinary atmospheric temperatures, and is liquefied when heated to a temperature not less than that necessary for vulcanizing, and preferably at a temperature not greatly in excess of that required; by way of example of such materials, it may be stated that an alloy of 21% cadmium and 79% bismuth melts at about 295° F.; or ammonium sulphate melts at 284° F. or ammonium nitrate melts at 312° F.

The method of using the unit is to heat it in a separate furnace, oven or the like, and when it has attained the desired temperature it is removed and the material 7 to be vulcanized is applied to the heating surface 6 of the unit. It thereupon absorbs heat from the unit, and in the case of a substance 9 which is liquefied as above stated, the heat first absorbed is a comparatively small amount whilst the liquid is cooling to its melting point, and then the liquid gives up its latent heat without further fall of temperature. As soon as the material 9 has become entirely solid, its temperature falls on the further extraction of heat, and the total heat capacity of the heating unit is so selected that this fall of temperature brings the heating unit below vulcanizing temperature at about the time that the process of vulcanizing has been completed. It will be appreciated that the further extraction of heat above referred to consists mainly of the losses by conduction, radiation and convection which ensue in the ordinary working of the apparatus. In order to neutralize as far as possible the variations in the external conditions which would effect the rate of this heat loss, it is desirable that the thermal storage unit should be effectively thermally insulated, except on the surface to which the material is applied. Obviously, the provision of this insulation leads also to economy in heat consumption. The whole heat treatment can, therefore, be entirely automatic, since the temperature can be controlled by selecting a material 9 having the desired melting point, and the period of time before the temperature falls below that necessary for vulcanizing can be determined by suitably selecting the heat capacity and the thermal insulation of the whole unit.

Whilst an arrangement such as that above mentioned will generally be the most convenient for use, it also lies within the scope of this invention to utilize the latent heat of evaporation of a suitable liquid in the container, instead of the latent heat of fusion in a solid. It will be appreciated that the range of liquids which may be selected is not limited to the same extent as is that of the alloys or solids, since the boiling point of the liquid which is the point at which it absorbs and gives up its latent heat can be controlled according to the pressure to which it is subjected. In manufacturing a thermal storage unit, using liquid, it is desirable to provide only such a quantity of liquid in a closed container 5 as will be entirely evaporated at a temperature not substantially in excess of that appropriate to vulcanization, as there is thereby provided a condition of affairs which tends to prevent the storage unit from attaining an excessive temperature.

According to another feature of the invention, the material which is liquefied or vapourized may be such that when it is in the solid or liquid state respectively, it is a poor conductor of heat, such for example as a material of the nature of wax. So long as the material is liquid, the convection currents set up in it during its cooling enable it to impart its heat easily to the material which is being vulcanized, but when the material commences to solidify it is a poor conductor of heat and it therefore gives up its heat more slowly. This is advantageous in that the heat is given up rapidly during the period of raising the temperature of the rubber which is to be vulcanized, and the subsequent rate of transmission of heat is automatically reduced in accordance with the reduced requirements, since it is only necessary to supply enough heat to compensate for the losses by radiation and conduction from the rubber to maintain it at the vulcanizing temperature.

It will be appreciated that in using a thermal storage unit in which the heat is stored as latent heat, the duration of the time of solidification, which is the time during which the temperature remains substantially constant, can be determined by selecting the amount of material which is liquefied, or of liquid which is vaporized, since the amount of heat which is given out at a steady temperature during solidification is directly proportioned to the weight of material which has been liquefied.

It may also be desirous in some instances to use two different substances or alloys which melt at different temperatures, so that two different periods of uniform temperature can be obtained during the cooling of the element, such periods giving respectively the temperatures of the different substances which have been melted, and in some instances it may be convenient to use a mixture which gives eutectic alloys at appropriate temperatures.

What I claim as my invention and desire to secure by Letters Patent is:

1. In vulcanizing apparatus, a heating unit comprising a thermal storage element which, when heated to a temperature not less than that required for vulcanizing, is of such a heat capacity in relation to the material to be vulcanized that it can heat up the said material and maintain it at not less than vulcanizing temperature for substantially not more than the requisite period of time, upon the expiry of which time the temperature of the element will have fallen below that required for vulcanizing, which element contains a material that is normally a poor conductor of heat and that changes its state when heated to a temperature not less than that required for vulcanizing, whereby heat is stored in it as latent heat.

2. In vulcanizing apparatus, a heating unit comprising a thermal storage element which, when heated to a temperature not less than that required for vulcanizing, is of such a heat capacity in relation to the material to be vulcanized that it can heat up the said material and maintain it at not less than vulcanizing temperature for substantially not more than the requisite period of time, upon the expiry of which time the temperature of the element will have fallen below that required for vulcanizing, which element contains a plurality of materials which will change their state at different temperatures, each of which temperature is appropriate to the process of vulcanization, whereby heat is stored in the element as latent heat.

In testimony whereof I affix my signature.

WILLIAM FROST.